Patented Nov. 23, 1926.

1,607,824

UNITED STATES PATENT OFFICE.

WILLIAM J. HALE AND JOSEPH W. BRITTON, OF MIDLAND, MICHIGAN, ASSIGNORS TO THE DOW CHEMICAL COMPANY, OF MIDLAND, MICHIGAN, A CORPORATION OF MICHIGAN.

PROCESS FOR MAKING ANILINE AND OTHER ARYLAMINES.

No Drawing. Application filed February 5, 1925. Serial No. 7,133. REISSUED

The present improvements relate more particularly to a process for making arylamines by reacting between the corresponding halogenated aromatic hydrocarbon and ammonia. In 1893, Merz and Paschkowezky (J. f. prakt. Chem. (2) 48, 465) announced the production of traces of aniline through the interaction of bromobenzine, ammonium carbonate, and dry soda lime when heated under pressure for many hours at 360-370°. In the German Patent, D. R. P. 204,951 (1907) the claim is made that an 80 per cent yield in aniline may be obtained by use of certain copper salts as catalysts upon chlorobenzene and aqueous ammonia when heated together under pressure for twenty hours at 180-200°; and still more recently, A. J. Quick (Am. Chem. Soc. 42, 1033 (1920)) has reported that cuprous salts are the effective agents in this reaction, whereas cupric salts, when held in oxidized form, and even metallic copper itself, are without action.

As a result of the foregoing reactions and of a careful study of the influence of various substances upon the possible catalysts, we have determined that cuprous salts are easily five times more effective than cupric salts and that neither copper nor any other metal, when present alone as such, has any effect as a catalyst in this reaction between chlorobenzene and aqueous ammonia.

We have, however, made the further important discovery that copper when added to a reaction mixture of halogenated benzene and aqueous ammonia containing a cuprous salt definitely promotes the catalytic effect of such salt and if sufficient copper be present to bring about a reduction of a cupric salt to cuprous state, then the latter may be equally well used thus in combination with copper. Accordingly, by the introduction into the system of either a cuprous salt or a cupric salt conjointly with the proper amount of copper, a commercially successful process for the manufacture of aniline from chlorobenzene or other halogenated benzene and ammonia becomes available.

The invention then consists of the steps indicated with the detail modifications hereinafter fully described and particularly pointed out in the claims, the following description setting forth but several of the various ways in which the principle of the invention may be used.

By way of comparison with the best results heretofore obtainable in a reaction of the general character in question, it may be stated that if in a reaction mixture of chlorobenzene and aqueous ammonia, containing 0.1 to 0.2 mol. of cuprous chloride, metallic copper be added, the reaction will be speeded up to such an extent that practically complete conversion is obtained within a few hours at 200 degrees C.; while at a slightly higher temperature, the conversion is complete in less than one hour.

The following is given as a specific example of the procedure involved in carrying out our improved method or process using monochlorobenzene and aqueous ammonia with cuprous chloride and copper as catalyst and promoter, respectively, viz:—

Chlorobenzene is mixed with a 25 per cent aqueous ammonia solution in such amounts as to furnish about five mol. of anhydrous ammonia to one mol. of the chlorobenzene. This mixture is then charged with 0.1 mol. of cuprous chloride and passed through a tubular system provided with copper heated to the desired temperature, which may range from 150-250° C. The same result may be obtained by heating this mixture in large copper autoclaves or autoclaves of inert material lined or provided with copper. The effluent liquors are discharged into closed vessels for removal, first, of the ammonia, then of the aniline, and finally the phenol, in the usual way.

The general reaction involved may be represented by the following equation, viz:—

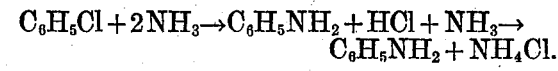

$$C_6H_5Cl + 2NH_3 \rightarrow C_6H_5NH_2 + HCl + NH_3 \rightarrow C_6H_5NH_2 + NH_4Cl.$$

Under ordinary conditions the proportion of phenol to aniline is about as 1:20. With somewhat higher concentrations of ammonia, this can be made to approach the proportion of 1:50 but beyond that it is not feasible, as at present advised, to proceed.

As will be noted in the foregoing description, our process is most advantageously carried out in a continuous tubular heating system to the employment of which such process is peculiarly adapted. A series of autoclaves joined to each other may also be found advantageous for use in this service.

We may state further that our investigations show that halides other than cuprous halides actually serve to retard the catalytic effect of copper salts. This has been made evident not only by a study of the action of ammonium chloride, sodium chloride, and similar chlorides, when added to the reaction mixture of chlorobenzene, ammonia and cuprous chloride, but also by a study of the action of halides or salts of those metals above as well as below copper in the electromotive series of metals when added to this same reaction mixture. Previous attempts to employ the general type of reaction herein in question involve the entry into the solution of a molecule of ammonium chloride simultaneously with each molecule of aniline that is formed; consequently as the conversion of halogenated benzene proceeds, the ammonium chloride building up necessarily retards more and more the effect of the catalyst itself, so that complete conversion was never obtainable. In our improved process on the contrary, the advantageous effect of the copper outweighs the disadvantageous effect of the ammonium chloride which thus builds up during the process. Especially is this true when air is present in the system chlorobenzene-ammonia-cuprous chloride and copper. In other words, the copper in the presence of ammonia combines with free oxygen with the production of cuprous oxide and thus nullifies any retardant action on the part of the ammonium halide through simple interaction of the latter with the cuprous oxide, more and more of such oxide, which is the effective catalyst, being currently introduced into the system. The reaction that occurs may be represented by the following equation:—

$$Cu_2O + 2NH_4Cl \rightarrow 2CuCl + 2NH_3 + H_2O.$$

When air is entirely absent from the system, the addition of a small amount, 0.2 mols. of cuprous oxide gives the same result in serving to reduce the concentration of ammonium halides to a negligible factor. In either case consideration of the quantity of cuprous chloride formed in process will be used to determine the quantity of the same catalyst required at the next stage.

We claim particularly to have discovered that with a maximum quantity of cuprous oxide present, in order to decompose all ammonium halides possible of formation, that is, 0.5 molecule of cuprous oxide per molecule of benzene halide, there remains a particular action of copper itself, wherein the effect of the catalytic action of cuprous salt in maximum supply is decidedly promoted.

The introduction of other metals than copper, either with or without various reducing agents, has failed completely in this direction and we are left with the conclusion that catalytic copper alone is a promoter to cuprous salts in the ammonolysis of halogenated benzene hydrocarbons. (By ammonolysis we typify the same general type of reaction known as hydrolysis, ammonia replacing water).

In conclusion, it may be stated that copper displays the same effect of a promoter to the cuprous salt catalyst in the reaction between aqueous ammonia and other polyhalogenated and substituted benzene hydrocarbons. In other words, it is to be understood that our improved process is applicable not merely to aniline or phenylamine, $C_6H_5.NH_2$, but to the production of the homologues of aniline or the various arylamines in general, as illustrated by the following examples, viz:—

1. Dichlorobenzene, $C_6H_4Cl_2$, with ammonium cuprous chloride and copper, readily yields $C_6H_4(NH_2)_2$, phenylene-diamine.
2. Chlorotoluene, $CH_3C_6H_4Cl$, similarly yields $CH_3C_6H_4NH_2$, toluidine.
3. Chloronaphthalene, $C_{10}H_7Cl$, similarly yields $C_{10}H_7NH_2$, naphthylamine.
4. Chloroanthraquinone, $C_{14}H_7O_2Cl$, similarly yields $C_{14}H_7NH_2$, amino-anthraquinone.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of making an arylamine, the step which consists in reacting between the corresponding halogenated aromatic hydrocarbon and ammonia in the presence of a copper compound and metallic copper.

2. In a method of making an arylamine, the step which consists in reacting between the corresponding halogenated aromatic hydrocarbon and ammonia in the presence of a cuprous compound and metallic copper.

3. In a method of making an arylamine, the step which consists in reacting between the corresponding halogenated aromatic hydrocarbon and ammonia in the presence of a cuprous oxide and metallic copper.

4. In a method of making aniline, the step which consists in reacting between a halogenated benzene and ammonia in the presence of a copper compound and metallic copper.

5. In a method of making aniline, the step which consists in reacting between mono-halogenated benzene and ammonia in the presence of a copper compound and metallic copper.

6. In a method of making aniline, the step which consists in reacting between chlorobenzene and ammonia in the presence of a cuprous compound and metallic copper.

7. In a method of making aniline, the step which consists in reacting between chlorobenzene and aqueous ammonia solution in approximately the proportion of one molecule of the former to five molecules of anhydrous ammonia, in the presence of a cuprous compound and metallic copper.

8. In a method of making aniline, the step which consists in reacting between chlorobenzene and aqueous ammonia solution in approximately the proportion of one molecule of the former to five molecules of anhydrous ammonia, in the presence of from 0.1 to 0.2 molecule of a cuprous compound and metallic copper.

9. In a method of making aniline, the step which consists in passing through a heated tubular system a reaction mixture of chlorobenzene and ammonia, with an addition of a cuprous compound.

10. In a method of making aniline, the step which consists in passing through a heated copper tubular system a reaction mixture of chlorobenzene and ammonia with an addition of cuprous oxide.

11. In a method of making aniline, the step which consists in passing through a copper tubular system heated from 150° to 250° C., a reaction mixture of chlorobenzene and ammonia, with an addition of a cuprous compound.

12. The method of promoting the effectiveness of a copper compound as a catalyst in a reaction of the character described which consists in conducting such reaction in the presence of metallic copper.

Signed by us this 2nd day of February, 1925.

WILLIAM J. HALE.
JOSEPH W. BRITTON.